United States Patent [19]

Buchanan et al.

[11] 4,291,387

[45] Sep. 22, 1981

[54] ANALOG TO DIGITAL CONVERSION WEIGHTING APPARATUS

[75] Inventors: James E. Buchanan, Bowie, Md.; Marshall L. Field, Jr., Cedar Rapids, Iowa

[73] Assignee: Westinghouse Electric Corp., Pittsburgh, Pa.

[21] Appl. No.: 17,664

[22] Filed: Mar. 5, 1979

[51] Int. Cl.³ .......... G06F 7/52

[52] U.S. Cl. .......... 364/757; 340/347 AD; 340/347 M

[58] Field of Search .......... 340/347 M, 347 AD; 364/759, 760, 757

[56] References Cited

U.S. PATENT DOCUMENTS

| | | | |
|---|---|---|---|
| 3,444,360 | 5/1969 | Swan | 364/606 |
| 3,611,350 | 10/1971 | Leibowitz | 340/347 AD |
| 3,875,391 | 4/1975 | Shapiro et al. | 364/200 X |
| 3,879,724 | 4/1975 | McDonald | 340/347 NT X |
| 4,072,938 | 2/1978 | Buchanan | 340/347 AD |
| 4,083,043 | 4/1978 | Breuer | 340/347 AD |

OTHER PUBLICATIONS

Gschwind, *Design of Digital Computers*, Springer-Verlag, 1967, p. 202.

Flores, *The Logic of Computer Arithmetic*, Prentice-Hall, Inc., 1963, pp. 164, 177-180.

*Primary Examiner*—Thomas J. Sloyan

*Attorney, Agent, or Firm*—H. W. Patterson

[57] ABSTRACT

A bucket brigade A/D weighting function multiplier which provides a simultaneous A/D conversion and multiplication by a weighting function in a continuous pipe line fashion, is disclosed. Each converted bit from the A/D converter is utilized by the multiplier as it becomes available instead of waiting for the conversion of the entire word, to provide a weighted digital output.

2 Claims, 5 Drawing Figures

ANALOG TO DIGITAL CONVERSION WEIGHTING APPARATUS

BACKGROUND OF THE INVENTION

Analog to digital converters of the type where an unknown analog voltage is converted to a multi-bit word in successive stages, wherein the most significant bit of the word is followed by the lesser significant bits in succession, are well known. Such sequential converters may be of the successive approximation or bucket brigade types. One such converter is described in U.S. Pat. No. 4,072,938, issued Feb. 7, 1978, and is hereby incorporated by reference.

Digital accumulators or multipliers of the type where the bits are input to the multiplier in serial form, and then are sequentially processed bit by bit to obtain the product, are also well known. Although such multipliers more commonly process initially the least significant bit followed by the more significant bits in succession, it is known that they may be designed to process initially the most significant bit followed by the lesser significant bits in succession. Such sequential multipliers, which are sometimes referred to as being of the shift and add type, where the most significant partial product is added first and then shifted to the left in a shift register is referred to on page 202 of a publication entitled, "Design of Digital Computers" by Hans W. Gschwind published in 1967; and on pages 164, 177 through 180 of a publication entitled, "The Logic of Computer Arithmetic" by Ivan Flores, published in 1963.

Heretofore, in converting an analog signal to a digital multi-bit word, and then processing such bits in a digital multiplier, the analog-to-digital conversion of all of the bits of a word were first completed and then the bits were processed (multiplied) in the appropriate sequence depending upon the design of the multiplier. This, of course, caused a delay between the completion of the conversion and the completion of the weighting or multiplication of the AND output and the weighting digital word; and in many cases necessitated the use of higher speed multiplier components in order to perform the weighting function without slowing down the rate of processing.

Thus, it is desirable to be able to multiply or weight the individual bits of a word as they become available from the analog to digital converter, instead of waiting for the conversion of the complete word. This in turn would permit the use of lower speed, and thus lower cost logic components, to perform the multiplication without slowing down the processing rate.

SUMMARY OF THE INVENTION

In accordance with the present invention, an apparatus is provided that includes a sequential analog to digital converter and a sequential digital multiplier, each of which respectively converts and processes initially the most significant bit of a word followed by the lesser significant bits in succession; and which is so configured that the bits of the word are processed in the multiplier as they become available in the converter.

DESCRIPTION OF THE PREFERRED EMBODIMENTS

Figure 1:
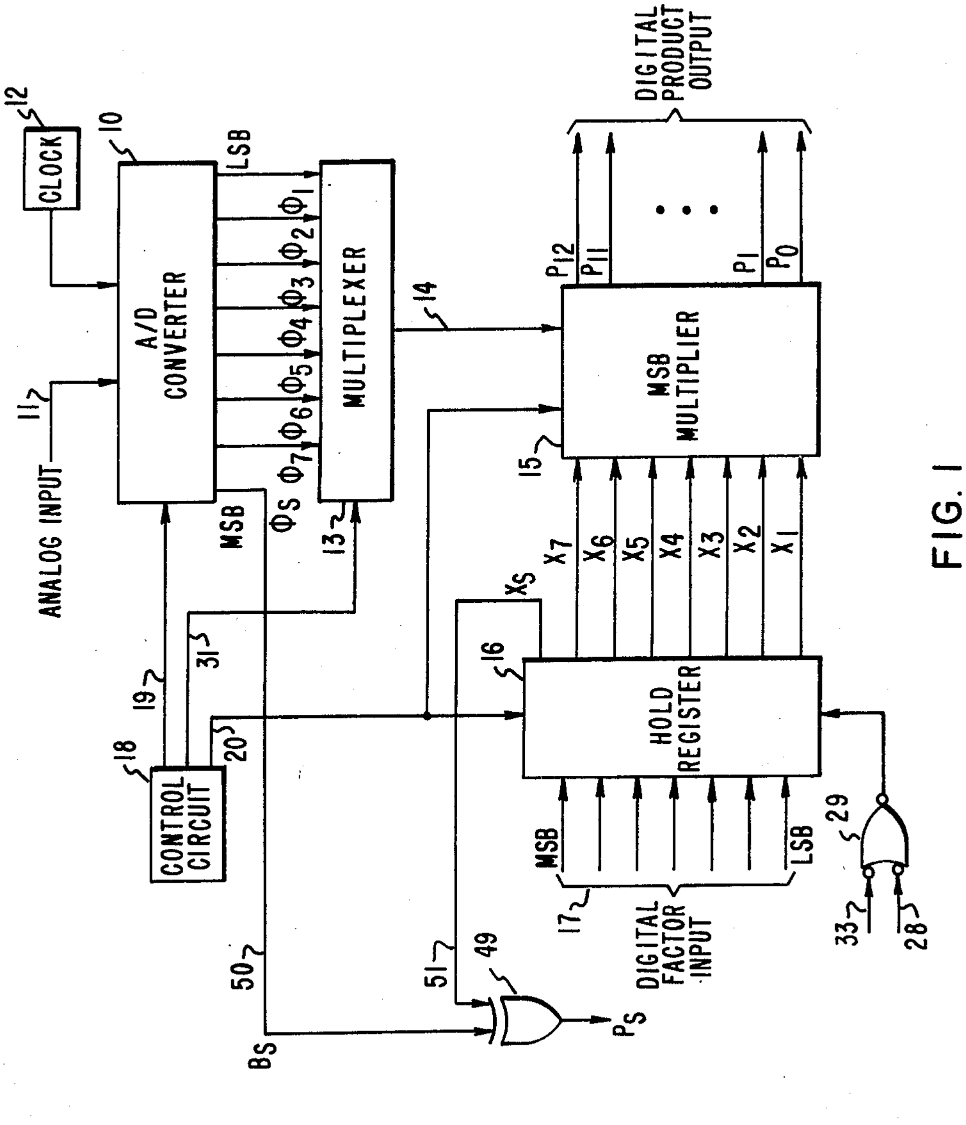
FIG. 1 is a block diagram of an apparatus in accordance with one embodiment of the present invention.

Referring to FIG. 1, an apparatus in accordance with the present invention is comprised of an analog to digital converter 10, which may be of the type described in U.S. Pat. No. 4,072,938, entitled, "Bucket Brigade Analog to Digital Converter" which is referred to herein for a more detailed description thereof. Briefly, the analog to digital converter 10 is of the type where all or a portion of a charge is stored and transferred from one storage device or stage to the next. The amount of each charge transferred determines the value of each binary bit on respective output lines referred to as $\phi_1$ through $\phi_8$ inclusive of an unknown analog voltage that is input on line 11. Clock pulses from a clock 12 for example, transfer the charge or a portion thereof from one stage to the next in the analog to digital converter and determines the precise time and speed of conversion. The individual bits are output or converted in sequence from the most significant bit to the least significant bit in succession. For the purposes of discussion, the bit on the output line $\phi_6$ is assumed to be the most significant bit (MSB) and the bit on the line $\phi_1$ is the least significant bit (LSB). The bits on the lines $\phi_7$ through $\phi_1$ are input to a multiplexer 13 which outputs such bits on line 14 in succession with the most significant bit first to a multiplier 15. The multiplier or accumulator 15, which is considered to be well known in the art operates on the well known "shift and add" principle similar to the normal multiplication procedure for base 10 multiplication. Such an accumulator computes partial products of the multiplier and each bit of the multiplicand with the order of the partial products starting with the most significant magnitude bit of the multiplicand.

A conventional "hold" register referred to at 16 is provided to input the digital factors that are to be combined with the multiplicand to provide an output on lines referred to as $X_1$ through $X_7$ inclusive. Each one of the bits of the digital weighting input is, of course, on the lines $X_1$ and $X_7$. The particular factors may be input to the whole register 16 on the inputs collectively referred to as 17 in accordance with any conventional well known technique. In the event a holding register is not required, as may be the case in certain system application where the weighting data is provided and held for the required period by the system, then the whole register 16 may be eliminated and the word corresponding to the weighting input applied directly to the lines $X_1$ through $X_7$ and $X_S$. However, the present arrangement provides for a holding register capability without any additional loss of time.

The product from the accumulator or multiplier 15 is output over lines referred to as $P_0$ through $P_{12}$ to provide the completed multiplied word.

A control circuit 18 is utilized to control both the A/D conversion and the multiplication over lines 19 and 20, respectively, in such a manner that a simultaneous A/D conversion and multiplication by a weighting function is provided. As hereinafter described, the multiplied result is produced during the same and final clock time as the final bit of the A/D conversion for a particular word is completed.

Figure 2:
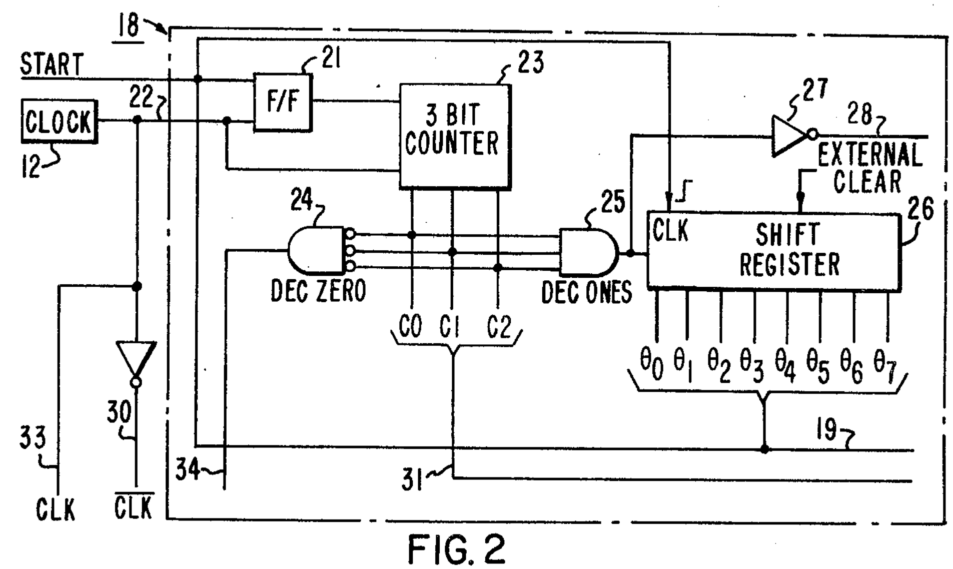
FIG. 2 illustrates in more detail the control portion of the diagram of FIG. 1.

Referring to FIG. 2, the control circuit 18 is contained within the dashed lines, and includes a conventional flip-flop circuit 21 that responds to clock pulses on line 22 from the clock 12 to operate a conventional three-bit counter 23. The output of the counter 23 is referred to as C0, C1, and C2 and are connected to the input of NAND and AND gates 24 and 25, respectively. The counter 23 determines exactly which operations are being performed during each clock time. The output of the AND gate 25 in conjunction with the clock 12 operates a serial shift register 26, the outputs of which are referred to as $\theta_0$ through $\theta_7$ inclusive to generate the external clocks necessary to operate the bucket brigade A/D converter 10 as described specifically in the reference U.S. Pat. No. 4,072,938 in order to output in succession, the individual bits of a multi-bit word commencing with the sign bit $\phi_S$ and then the most significant bit on line $\phi_7$ (FIG. 1).

The operation of the shift register 26 for an eight bit configuration in response to the output of the gate 25 may be as follows:

| C | DECONES | $\theta_0$ | $\theta_1$ | $\theta_2$ | $\theta_3$ | $\theta_4$ | $\theta_5$ | $\theta_6$ | $\theta_7$ |
|---|---|---|---|---|---|---|---|---|---|
| 7 | 1 | X | X | X | X | X | X | X | X |
| 0 | 0 | 1 | 0 | 0 | 0 | 0 | 0 | 0 | 0 |
| 1 | 0 | 0 | 1 | 0 | 0 | 0 | 0 | 0 | 0 |
| 2 | 0 | 0 | 0 | 1 | 0 | 0 | 0 | 0 | 0 |
| 3 | 0 | 0 | 0 | 0 | 1 | 0 | 0 | 0 | 0 |
| 4 | 0 | 0 | 0 | 0 | 0 | 1 | 0 | 0 | 0 |
| 5 | 0 | 0 | 0 | 0 | 0 | 0 | 1 | 0 | 0 |
| 6 | 0 | 0 | 0 | 0 | 0 | 0 | 0 | 1 | 0 |
| 7 | 1 | 0 | 0 | 0 | 0 | 0 | 0 | 0 | 1 |
| 0 | 0 | 1 | 0 | 0 | 0 | 0 | 0 | 0 | 0 |
| 1 | 0 | 0 | 1 | 0 | 0 | 0 | 0 | 0 | 0 |

Figure 3:
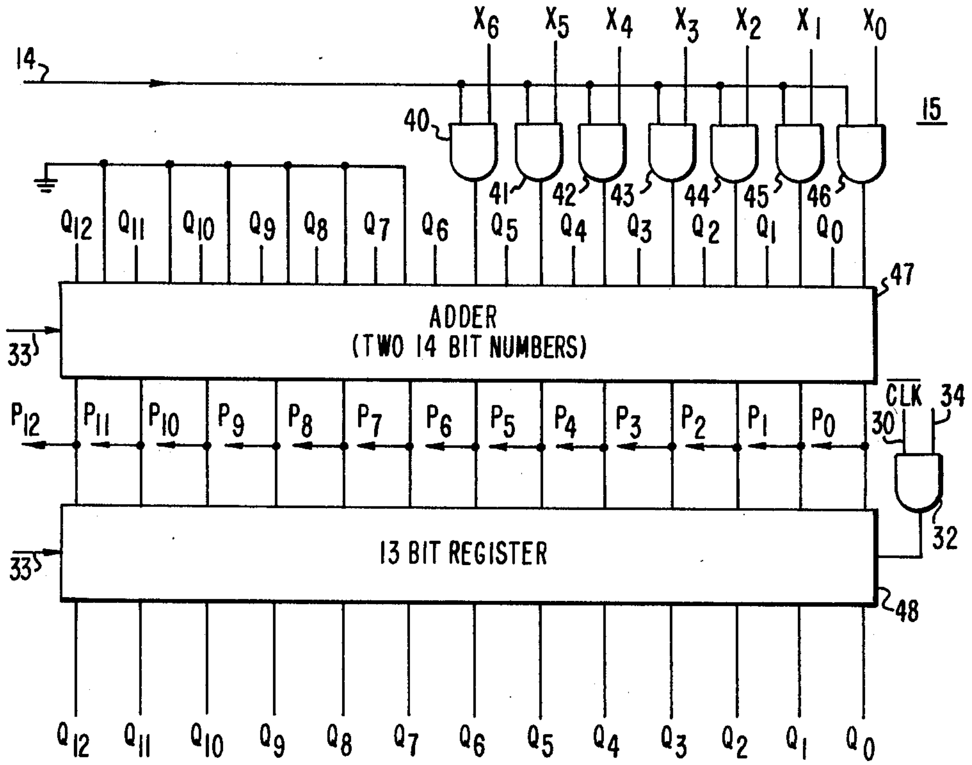
FIG. 3 illustrates in more detail the most significant bit multiplier of FIG. 1.

At the output of the AND gate 25 is an inverter 27, the output of which is referred to at 28, which is input to a negative AND gate 29 (FIG. 1) which loads in parallel the various bits of the holding register 16 upon the simultaneous occurrence of the absence of a clock pulse referred to as CLK on line 33. This serves to input the digital weighting factors into the multiplier 14 for use with each of the bit conversions of the A/D converter 10 as the A/D bits become available. The outputs C0, C1 and C2, referred to at 31 (FIG. 2) is connected to operate the multiplexer 13 (FIG. 1) to provide the most recently A/D converted bit from the converter 10 and to assist in clearing the accumulator during the time when the outputs C0, C1 and C2 all equal 0. The negative NAND gate 24, which outputs when C0, C1, and C2 are all 0 is connected to AND gate 32 (FIG. 3) to clear the shift register after each complete word in conjunction with a $\overline{\text{CLK}}$ input on line 30. An output 33 from the clock 12 is connected to a similarly-numbered input (FIG. 3) to operate the adder and register as more specifically described in connection with FIG. 4.

The output 14 of the multiplexer provides an input to each of the AND gates referred to as 40 through 46 inclusive; with the other input to each of the AND gates referred to as $X_0$ through $X_6$ inclusive which may be the outputs of the holding register 16 of FIG. 1. The outputs of the AND gates 40 through 46 are input to a conventional adder 47, which in combination with a bit register 48 provides the function of the multiplier 15 to produce the product output on lines referred to as $P_0$ through $P_{12}$, inclusive. Thus, the output 14 of the multiplexer selects each magnitude bit of the A/D converted word during the clock time when that bit is converted. The partial product of the output of the multiplexer and the multiplier register ($X_6$–$X_0$) is formed in the logical "AND" gates 40 through 46, whose outputs are connected to the adder 47. The "AND" gates are sufficient to compute the partial product since the output of the multiplexer is always either a digital "1" or "0" and "1" times a number is the number itself and "0" times a number is 0. Because the partial products are computed starting with the most significant bit and then descending in succession, the accumulator register output referred to as $Q_0$ through $Q_{12}$ is shifted up by one bit as it enters the adder portion 47 during the addition of each new partial product. This operation may be considered equivalent to shifting each successive partial product one digit to the left in normal base 10 multiplication. Thus, each new partial product is added to the proper bits of the existing sum of partial products. In addition, the sign of the product is determined by an exclusive OR gate 49 (FIG. 1) having an input 50 from the A/D converter 10 and an input 51 from the hold register 16 (see FIG. 1). Since the same signs on the multiplier and the multiplicand result in a positive answer and opposite signs result in a negative answer, the sign bit of the product can be found by forming the "exclusive-OR" of the sign bits of the multiplier and the multiplicand. Thus, the output $P_S$ of the exclusive "OR" gate 49 is a portion of the final product as are the outputs $P_0$ through $P_{12}$ of FIG. 3.

Although in the embodiment illustrated, it is assumed that an eight bit sign magnitude A/D converter and an eight-bit sign magnitude multiplier is utilized, yielding a fifteen bit sign magnitude product, it is understood that the arrangement described can be generalized to an A/D converter of J bits and a multiplier of K bits yielding a product of $J+K-1$ bits, all in sign magnitude. In general, in accordance with the teachings of the present invention, this would require converting the control counter 23 to a modulo-J counter, expanding the serial shift register 26 to J bits, expanding the 8 to 1 multiplexer 13 to a J:1 multiplexer and enlarging the accumulator 15 to compute and store a product of $J+K-1$ bits.

Figure 4A:
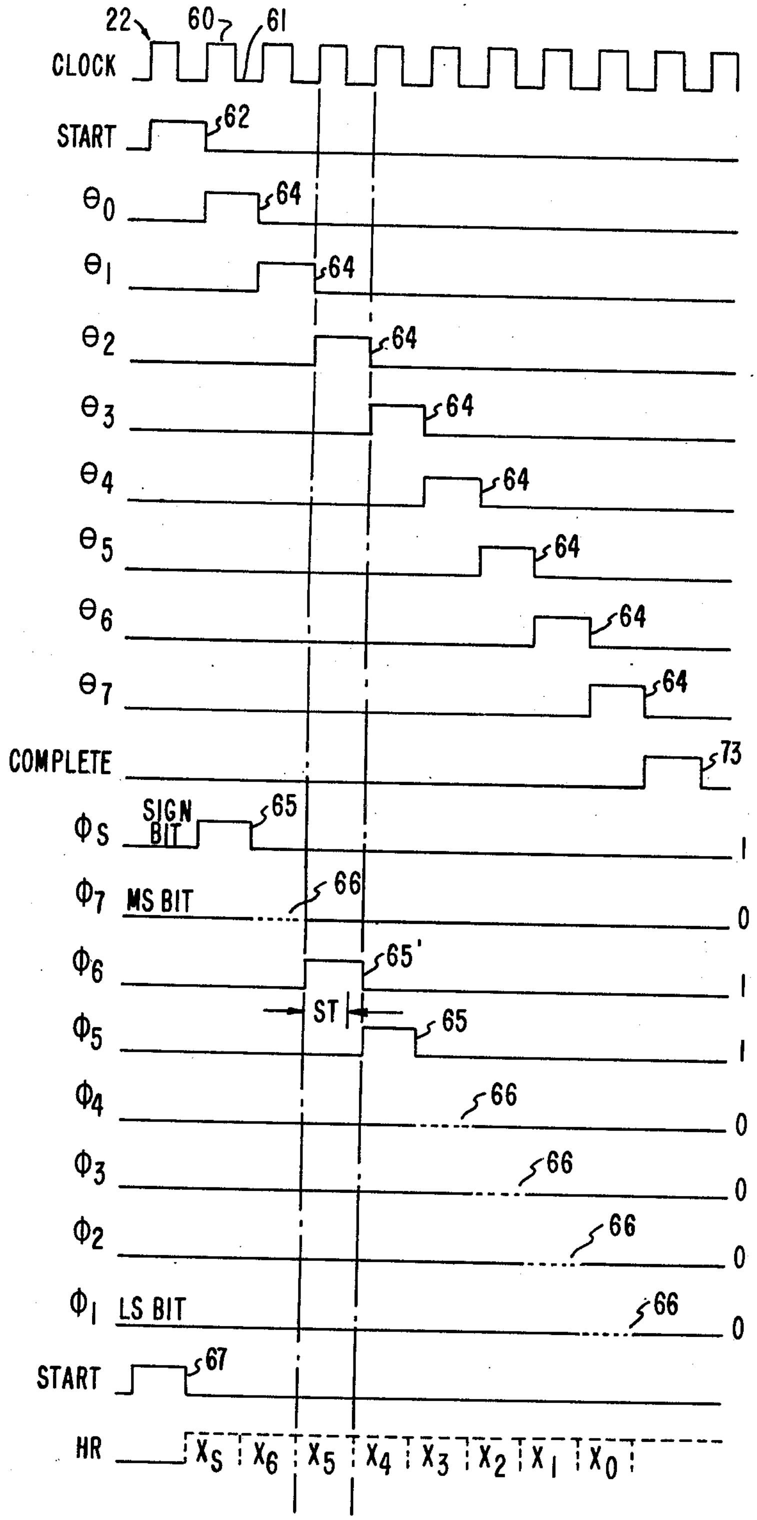
FIGS. 4A-4B are timing diagrams to illustrate the operation of the apparatus in accordance with the present invention.
Figure 4B:
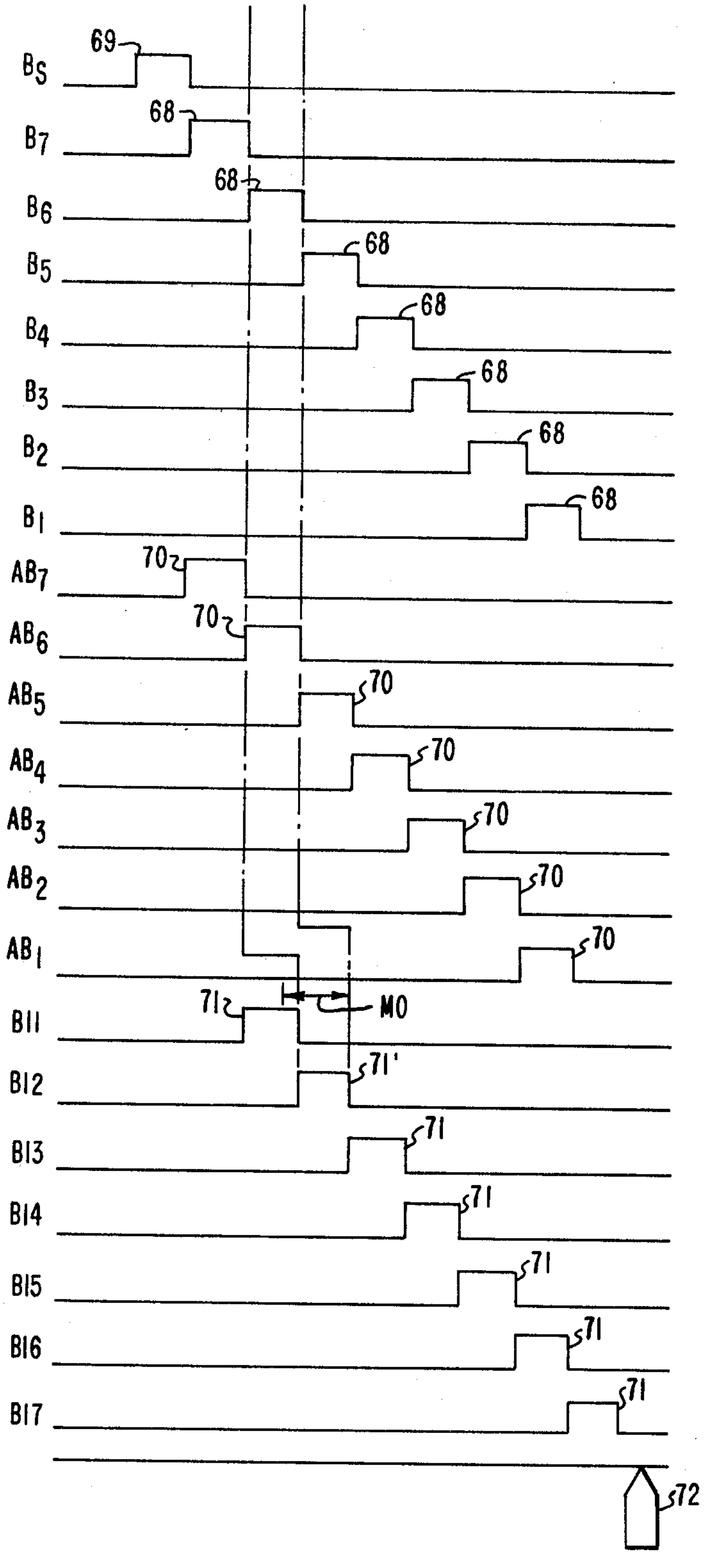

Referring to FIGS. 4A and 4B and in describing the operation of the apparatus of the present invention, the various diagrams bear reference numerals that are identical to those provided at the output of the particular device applicable to such diagram, where appropriate. Continuous clock pulses referred to generally by waveform 22 provides a positive output 60 for each clock pulse CLK and an output that is either zero or negative at 61 for each CLK pulse and a positive pulse at 61 for the signal or CLK referred to as $\overline{\text{CLK}}$. A start pulse which denotes the beginning of each multi-bit word is referred to at 62. In FIG. 4, that portion of the diagram having lines labeled $\theta_0$ through $\theta_7$ inclusive, represent for each one of the respective bits timing pulses referred to at 64 for timing both the A/D converter 10, the multiplier or accumulator 14, and the holding register 16. The output of the shift register 26 in response to the operation of the three-bit counter 23 as previously described, provides a timing for each of the bits of the A/D converter 10 to convert each of the bits during the time as shown by pulses referred to at 65. Those pulses that are in the solid dashed lines such as 65, represent a "1" bit while pulses constructed with dashed lines such as referred to at 66 represent "0" bits. Thus, it is seen that the control pulses provide for the conversion of each bit of the A/D converter to produce at its output digital bits of information at a time corresponding to the occurrence of each of the pulses such as 65 or 66. A starting pulse referred to at 67 occurs simultaneously with the start pulse 62 prior to the beginning of each word upon the operation of the flip-flop circuit 21 to its start position after the completion of the combinations of C0, C1 and C2 of the three-bit counter. Such a start is represented in FIG. 1 as being input on line 19 and 20 to simultaneously start the A/D converter and the accumulator in synchronism at the beginning of each word. The output of the holding register 16 is represented by the adjacent pulses referred to as $X_S$, and $X_7$ through $X_0$ for inputting to the multiplier 15 the particular weighting factor that is to be multiplied therein. As previously mentioned, the holding register 16 may be eliminated in the event that the weighting factor is held for the required period by the system source but is so described such that such weighting factor can be constant or can change prior to the beginning of each word during the start pulse, for example. The timing output for the multiplexer 31, is represented by the timing pulse forms $B_7$ through $B_1$ and occurs for each respective bit during the time it is represented by pulses referred to as 68. The timing pulse on line $B_S$ referred to at 69 is the sign bit.

The following table describes a typical sequence of operation of the device of the present invention.

| Counter C2 | Counter C1 | Counter C0 | Output of 10 | Output of Bucket Brigade Multiplexer 13 | Operation being performed in 10 |
|---|---|---|---|---|---|
| 0 | 0 | 0 | $B_S$ | 0 | Determine sign bit of product and clear accumulator |
| 0 | 0 | 1 | $B_7$ | $B_7$ | Add partial product of $B_7$ times the multiplier |
| 0 | 1 | 0 | $B_6$ | $B_6$ | Add partial product of $B_6$ times the multiplier |
| 0 | 1 | 1 | $B_5$ | $B_5$ | Add partial product of $B_5$ times the multiplier |
| 1 | 0 | 0 | $B_4$ | $B_4$ | Add partial product of $B_4$ times the multiplier |
| 1 | 0 | 1 | $B_3$ | $B_3$ | Add partial product of $B_3$ times the multiplier |
| 1 | 1 | 0 | $B_2$ | $B_2$ | Add partial product of $B_2$ times the multiplier |
| 1 | 1 | 1 | $B_1$ | $B_1$ | Add partial product of $B_1$ times the multiplier, provide clock to the outside world for taking the final result and clock in the new multiplier value |
| Start of next Conversion/Multiply | | | | | |
| 0 | 0 | 0 | | | |

The timing for operating the accumulator 15 upon the occurrence of an output on line 34 from the NAND gate 24 of the three-bit counter occurs at times between clock pulses 60 or during the occurrence of clock pulses 61. Each bit is processed to be output from the AND gates 40 through 46, inclusive as represented by pulses referred to at 70 of the lines $AB_7$ through $AB_1$. The shift-and-add timing for the adder 47 and the thirteen-bit register 48 occurs for each respective bit at the times represented by pulses 71 of the lines B11 through B17. Block 72 represents the time when the product of the entire word is available which occurs in response to timing pulses 73 (FIG. 4A) when the output C0, C1, and C2 are all zero to mark the end of each word.

That portion of one of the pulses 65 referred to as 65' between the arrows ST represents the clock waveform 22 and the bucket brigade A/D settling time for each bit as it is determined. The particular settling time is illustrated for bit number two in the described embodiment, but it is understood, that such settling time occurs for each of the other bits of a word. The time available for multiplier operation including the partial products formed for the respective bits as described by pulses 68 is illustrated as being between the arrows referred to as MO during the occurrence of one of the pulses 71 and pulse 71'. It is noted, that the operation of the multiplier for bit number two as noted by the waveform B12 occurs subsequent to the occurrence of the pulse 65' for such bit B2 as it is converted by the A/D converter. Thus, as each bit is converted by the A/D converter, it is multiplied by a weighting function prior to the completion of that word with the product being available for the entire word at a clock time that is substantially adjacent to the time of conversion of the least significant bit.

In summary, the bucket brigade A/D weighting function multiplier in accordance with the present invention provides simultaneous A/D conversion and multiplication by a weighting function which may be dynamic. It produces the multiplied result in the next clock time that occurs upon the completion of the A/D conversion for a particular word. In other words, the multiplier takes advantage of each converted bit as it becomes available instead of waiting for the entire word to produce the converted and multiplied result in a minimum time.

We claim:

1. In apparatus for converting an analog signal to a multi-bit digital word that is the product of the digital signal and a selected weighting factor, that includes:

an analog to digital converter operative to generate a plurality of information bits that corresponds to the input signal in sequence from the most significant to the least significant bit of a word, and a digital multiplier operative to sequentially process each of said bits in sequence from the most significant to the least significant bit of the word to generate a multi-bit word product wherein the improvement comprises:

control means including a multiplexer connecting the converter and multiplier operative to transfer from the converter to the multiplier each of the bits in succession to process in succession the most significant to the least significant bit prior to the completion of the conversion of the entire multi-bit digital word, and including a holding register operative to apply bits of a digital word to the multiplier to weight the converted bits.

2. In apparatus for converting analog signal to a multi-bit digital word that is the product of the digital word and a selected digital weighting factor, that includes:

a bucket brigade analog to digital converter operative to convert the analog signal to a plurality of bits in succession from the most significant to the least significant bit of the word, means to apply a digital factor to each of the bits, and a sequential digital multiplier, including means operative to generate partial products of each bit and its corresponding factor sequentially, an adder operative to shift the bits in a direction to process the most significant bit to the least significant bit in succession, and a register operative to output a multi-bit digital word product upon completion of the procession of the least significant bit, wherein the improvement comprises;

control means including a multiplexer connected to the converter operative to transfer from the converter to the multiplier each of the bits in succession to commence processing therein each of the bits in the multiplier as they are converted in the converter prior to the completion of the conversion of the entire multi-bit digital word.

* * * * *